(12) United States Patent
Pompeo

(10) Patent No.: US 10,653,214 B1
(45) Date of Patent: May 19, 2020

(54) WRIST OR FOREARM BRACE WITH INTEGRAL TAPE MEASURE HOLDER

(71) Applicant: Mark Pompeo, Exeter, RI (US)

(72) Inventor: Mark Pompeo, Exeter, RI (US)

( * ) Notice: Subject to any disclaimer, the term of this patent is extended or adjusted under 35 U.S.C. 154(b) by 0 days.

(21) Appl. No.: 16/378,681

(22) Filed: Apr. 9, 2019

(51) Int. Cl.
*A45F 5/00* (2006.01)
*G01B 3/1071* (2020.01)
*A44C 5/00* (2006.01)
*G01B 3/1084* (2020.01)

(52) U.S. Cl.
CPC ............... *A44C 5/003* (2013.01); *A45F 5/00* (2013.01); *G01B 3/1084* (2013.01); *A45F 2005/008* (2013.01); *A45F 2200/0575* (2013.01); *G01B 3/1071* (2013.01)

(58) Field of Classification Search
CPC ....... A45F 2005/008; A45F 2200/0575; G01B 3/1071
USPC .......................... D3/228; 224/219, 222, 904
See application file for complete search history.

(56) References Cited

U.S. PATENT DOCUMENTS

| | | | | |
|---|---|---|---|---|
| 2,807,886 A | * | 10/1957 | Aciego | G01B 3/1084 33/668 |
| D193,678 S | * | 9/1962 | Goldman | D3/228 |
| D196,542 S | * | 10/1963 | Zelnick | D3/228 |
| D253,939 S | | 1/1980 | Montgomery | |
| 4,598,027 A | * | 7/1986 | Johnson | A45F 5/02 156/212 |
| 4,821,933 A | * | 4/1989 | Seber | A45F 5/02 224/248 |
| 5,100,037 A | * | 3/1992 | Kopyta | A45F 5/02 224/235 |
| 5,257,729 A | | 11/1993 | Silvernail | |
| D347,589 S | | 6/1994 | LaBate | |
| 5,388,741 A | * | 2/1995 | Hillinger | G01B 3/1071 224/679 |
| 5,551,613 A | * | 9/1996 | Malinowski | A45F 5/02 224/666 |
| 5,615,817 A | * | 4/1997 | Shevers, Jr. | A45F 5/00 108/43 |
| 5,845,413 A | * | 12/1998 | Zayat, Jr. | G01B 3/1084 33/760 |
| 6,094,403 A | | 7/2000 | Tran | |
| D437,999 S | * | 2/2001 | Williamson | D3/228 |
| 6,457,252 B1 | * | 10/2002 | Kershner | G01B 3/1071 33/755 |
| 7,201,201 B2 | | 4/2007 | Grenier | |
| 8,210,406 B2 | * | 7/2012 | Moreau | A45F 5/00 224/219 |
| D676,234 S | * | 2/2013 | Moreau | D3/228 |
| D696,512 S | * | 12/2013 | Kryklywicz | D3/215 |
| D711,753 S | * | 8/2014 | Moreau | D10/74 |
| 9,170,082 B2 | * | 10/2015 | Moreau | G01B 3/1041 |

(Continued)

*Primary Examiner* — Justin M Larson
(74) *Attorney, Agent, or Firm* — Kyle A. Fletcher, Esq.

(57) ABSTRACT

The wrist or forearm brace with integral tape measure holder comprises a brace, a pouch, and a flap. The brace may be adapted to wrap around an extremity of a user. As non-limiting examples, the extremity may be a wrist or a forearm. A tape measure may be placed into the pouch. A blade of the tape measure may be accessible via a blade aperture and a lock button of the tape measure may be accessible via a button aperture without removing the tape measure from the pouch. The tape measure may be operated without removing the tape measure from the pouch.

17 Claims, 5 Drawing Sheets

(56) References Cited

U.S. PATENT DOCUMENTS

| | | | |
|---|---|---|---|
| 9,248,565 B1 * | 2/2016 | Latham | B25H 3/006 |
| 9,314,091 B2 | 4/2016 | Schulz | |
| D758,220 S * | 6/2016 | Votel | D10/74 |
| D764,325 S * | 8/2016 | Mathews, Jr. | D10/72 |
| 9,504,310 B2 * | 11/2016 | Foreman | A45F 5/021 |
| 10,182,641 B1 * | 1/2019 | Goodman | A45F 5/021 |
| 2003/0164389 A1 | 9/2003 | Byers | |
| 2014/0310969 A1 * | 10/2014 | Moreau | G01B 3/1041 |
| | | | 33/769 |
| 2015/0289615 A1 * | 10/2015 | Welsch | G06F 1/163 |
| | | | 224/219 |

* cited by examiner

WRIST OR FOREARM BRACE WITH INTEGRAL TAPE MEASURE HOLDER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of tools, more specifically, a wrist or forearm brace with integral tape measure holder.

SUMMARY OF INVENTION

The wrist or forearm brace with integral tape measure holder comprises a brace, a pouch, and a flap. The brace may be adapted to wrap around an extremity of a user. As non-limiting examples, the extremity may be a wrist or a forearm. A tape measure may be placed into the pouch. A blade of the tape measure may be accessible via a blade aperture and a lock button of the tape measure may be accessible via a button aperture without removing the tape measure from the pouch. The tape measure may be operated without removing the tape measure from the pouch.

An object of the invention is to provide a brace for holding a tape measure on a user's wrist or forearm.

Another object of the invention is to removably couple the brace to the user's wrist or forearm A further object of the invention is to provide a pouch on the brace for holding the tape measure.

Yet another object of the invention is to provide a flap, a blade aperture, and a button aperture on the pouch for accessing and operating the tape measure.

These together with additional objects, features and advantages of the wrist or forearm brace with integral tape measure holder will be readily apparent to those of ordinary skill in the art upon reading the following detailed description of the presently preferred, but nonetheless illustrative, embodiments when taken in conjunction with the accompanying drawings.

In this respect, before explaining the current embodiments of the wrist or forearm brace with integral tape measure holder in detail, it is to be understood that the wrist or forearm brace with integral tape measure holder is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the wrist or forearm brace with integral tape measure holder.

It is therefore important that the claims be regarded as including such equivalent construction insofar as they do not depart from the spirit and scope of the wrist or forearm brace with integral tape measure holder. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
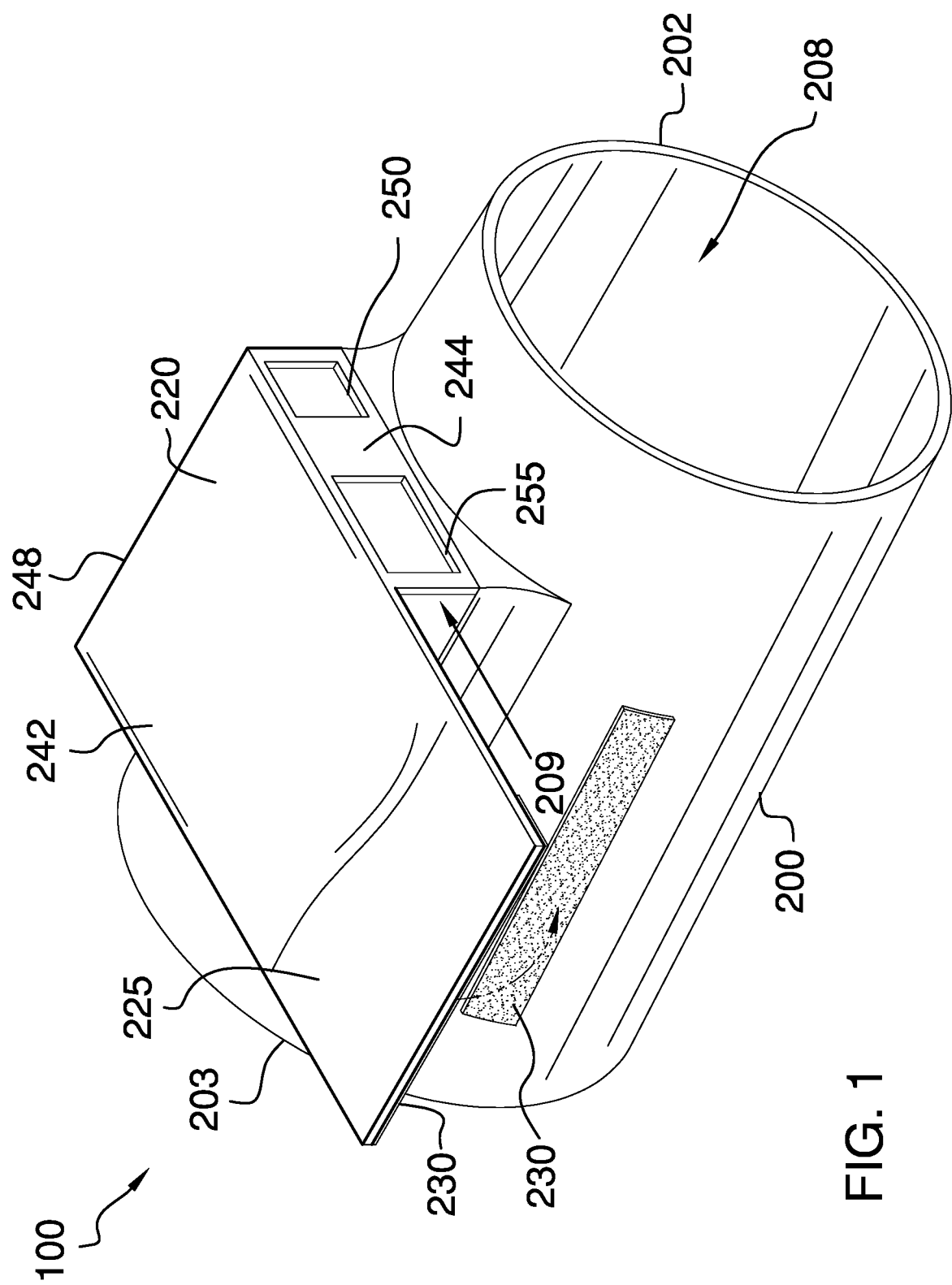
FIG. 1 is a perspective view of an embodiment of the disclosure.
Figure 2:
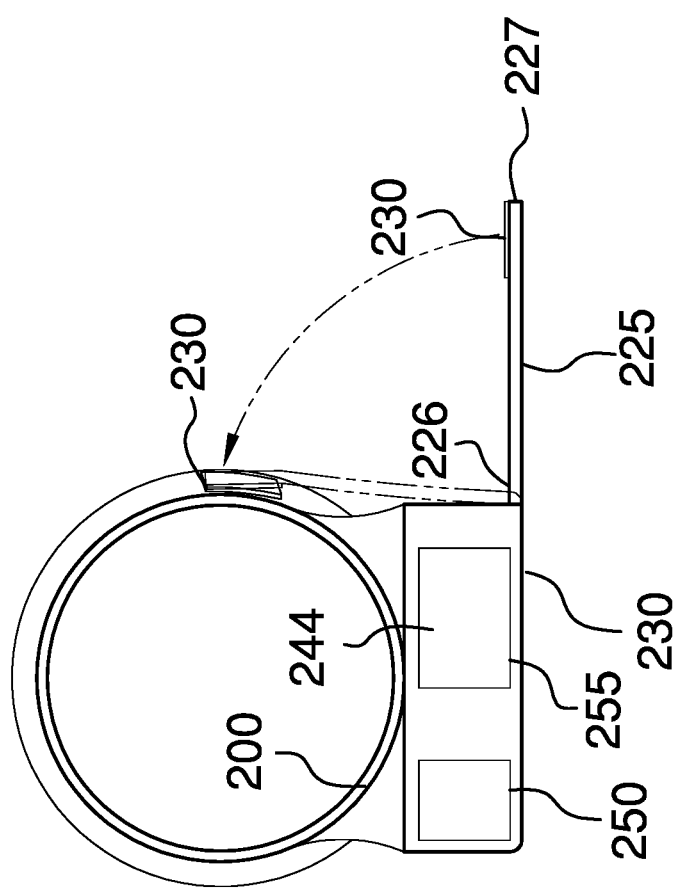
FIG. 2 is a front view of an embodiment of the disclosure.
Figure 3:
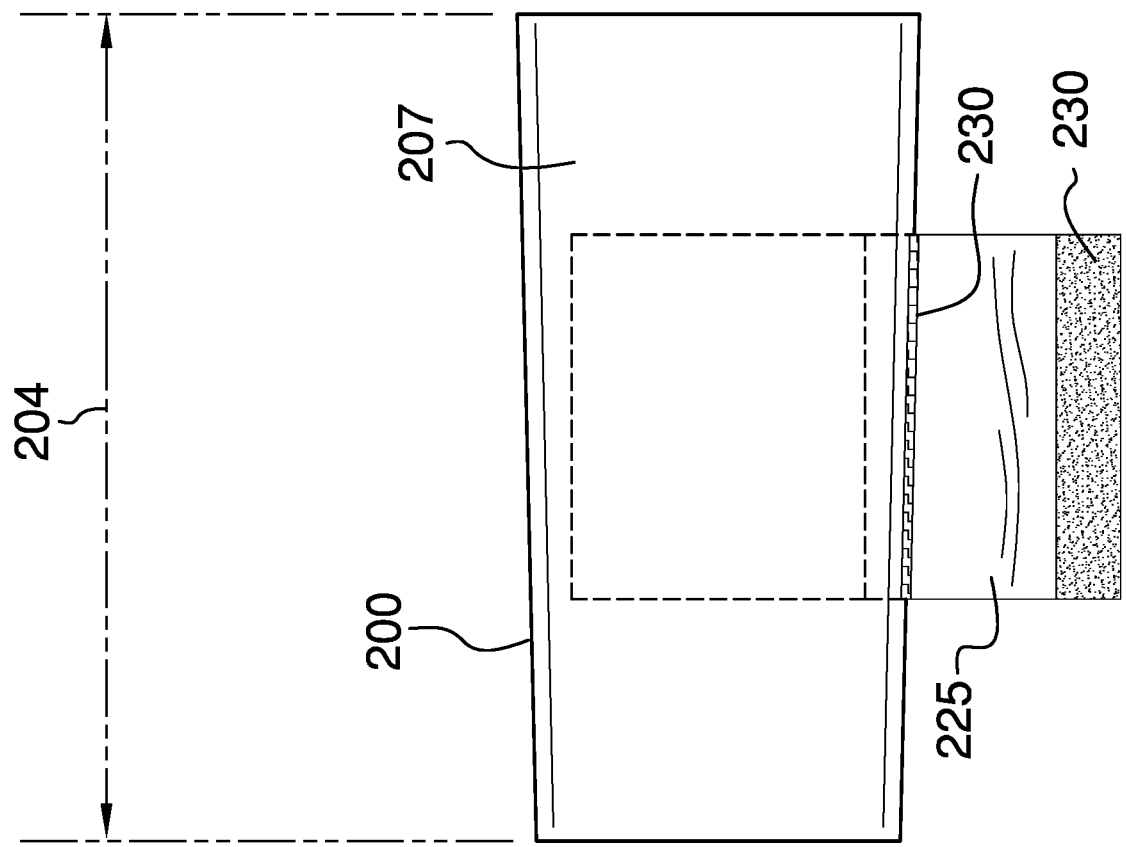
FIG. 3 is a bottom view of an embodiment of the disclosure.
Figure 4:
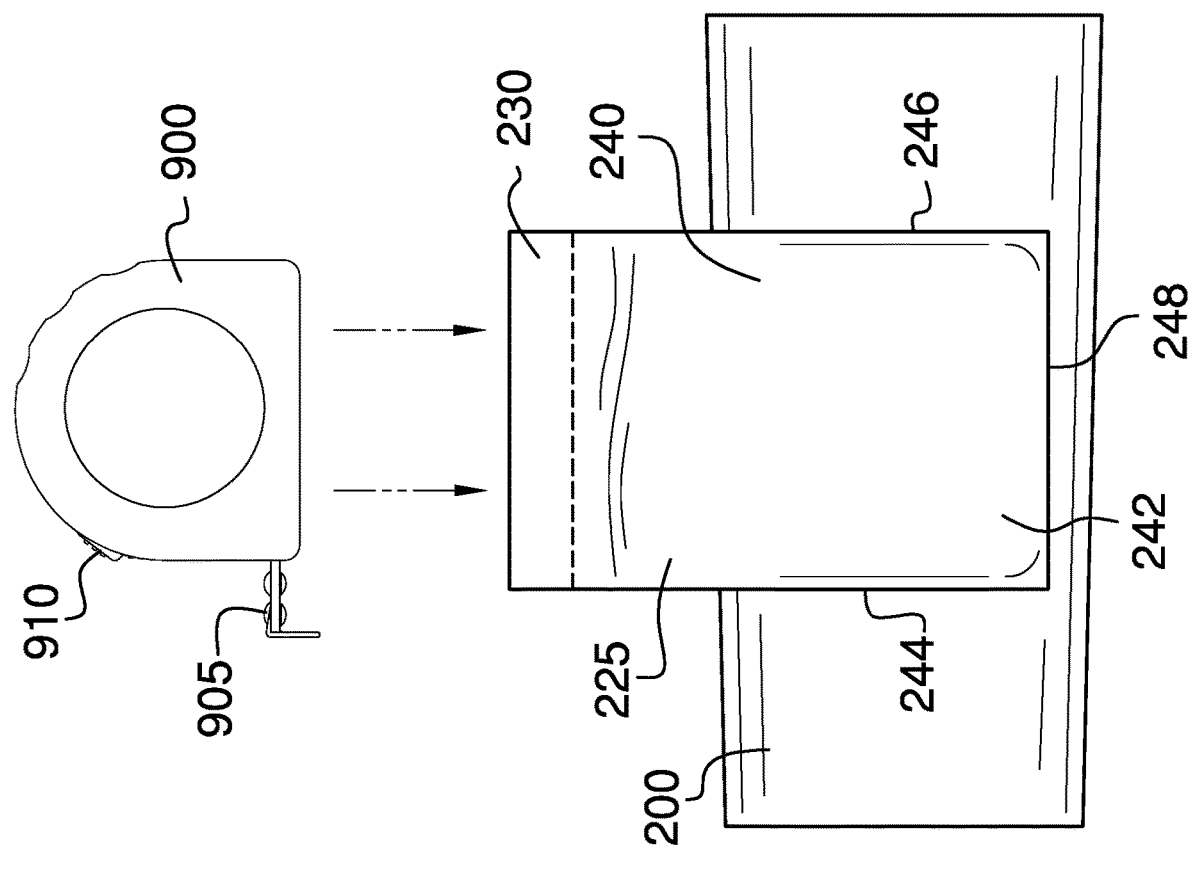
FIG. 4 is a top view of an embodiment of the disclosure.
Figure 5:
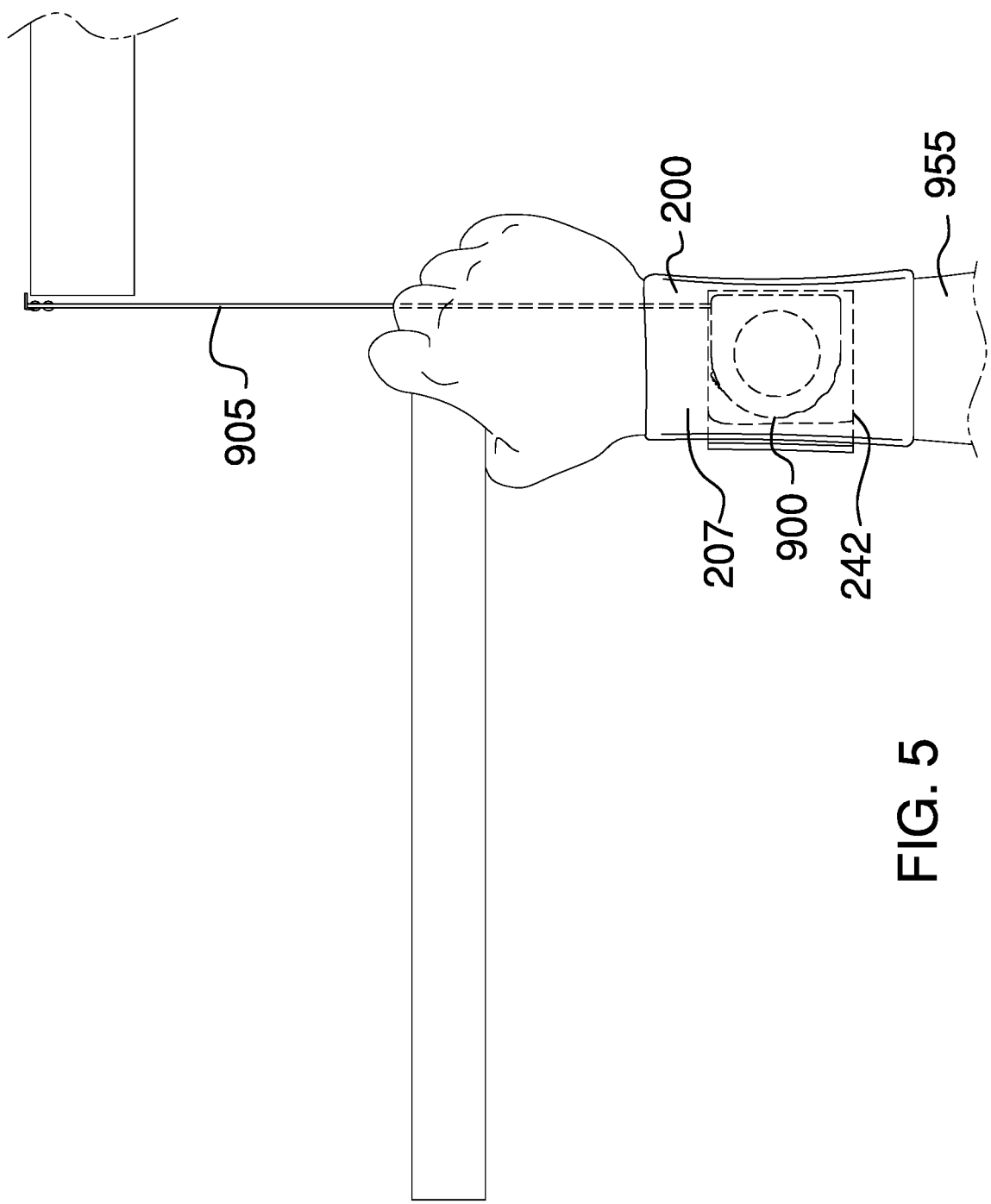
FIG. 5 is an in-use view of an embodiment of the disclosure.

Detailed reference will now be made to a first potential embodiment of the disclosure, which is illustrated in FIGS. 1 through 5.

The wrist or forearm brace with integral tape measure holder 100 (hereinafter invention) comprises a brace 200, a pouch 220, and a flap 225. The brace 200 may be adapted to wrap around an extremity 955 of a user. As non-limiting examples, the extremity 955 may be a wrist or a forearm. A tape measure 900 may be placed into the pouch 220. A blade 905 of the tape measure 900 may be accessible via a blade aperture 250 and a lock button 910 of the tape measure 900 may be accessible via a button aperture 255 without removing the tape measure 900 from the pouch 220. The tape measure 900 may be operated without removing the tape measure 900 from the pouch 220.

The brace 200 may be an elastic tube comprising a distal end 202 and a proximal end 203. A length 204 of the brace 200 as measured from the distal end 202 to the proximal end 203 may be at least as long as the width of the tape measure 900. The brace 200 may be adapted to slide over the user's hand by stretching. The brace 200 may be adapted to contract once past the hand to grip the extremity 955. The pouch 220 may be coupled to the brace 200 directly or via a wrist adapter 235. In some embodiments, the diameter of the proximal end 203 of the brace 200 may be larger than the diameter of the distal end 202 of the brace 200 such that the brace 200 is adapted to conform to the shape of the extremity 955.

The pouch 220 may comprise an upper wall 242, a distal side wall 244, a proximal side wall 246, and a bottom wall 248. The brace 200 that the pouch 220 is coupled to may form the lower wall of the pouch 220. The pouch 220 may be a pocket into which the tape measure 900 may be placed. The distal edge of the upper wall 242 may be coupled to the upper edge of the distal side wall 244. The proximal edge of the upper wall 242 may be coupled to the upper edge of the proximal side wall 246. The bottom edge of the upper wall 242 may be coupled to the upper edge of the bottom wall 248. The bottom edge of the distal side wall 244 may be coupled to the distal edge of the bottom wall 248. The bottom edge of the proximal side wall 246 may be coupled to the proximal edge of the bottom wall 248. The side of the pouch 220 that is opposite the bottom wall 248 may be left open to form a tape measure aperture 240. The tape measure 900 may be placed into the pouch 220 by passing it through the tape measure aperture 240. The height, width, and length of the interior of the pouch 220 may be at least as large as the height, width, and length of the tape measure 900 such that the tape measure 900 fits inside of the pouch 220.

The distal side wall 244 may comprise the blade aperture 250. The blade aperture 250 may be positioned such that when the tape measure 900 is within the pouch 220, the blade 905 of the tape measure 900 may align with the blade aperture 250.

The distal side wall 244 may comprise the button aperture 255. The button aperture 255 may be positioned such that when the tape measure 900 is within the pouch 220, the lock button 910 on the tape measure 900 may align with the button aperture 255.

In some embodiments, the wrist adapter 235 may adapt the curved shape of the extremity 955 to the flat shape of the tape measure 900. The wrist adapter 235 may be a rigid or semi-rigid armature that may be interposed between the brace 200 and the pouch 220.

The flap 225 may be a flexible cover for the tape measure aperture 240. A first end 226 of the flap 225 may be coupled to the pouch 220 at an upper side of the tape measure aperture 240. The flap 225 may cover the tape measure aperture 240 when the flap 225 is pulled towards the brace 200. A second end 227 of the flap 225 may couple to the brace 200 via a fastener 230. As a non-limiting example, the fastener 230 may be a hook and loop fastener.

In some embodiments, the invention 100 may comprise a right-handed version and a left-handed version. The left-handed version of the invention 100 may be a mirror-image of the right-handed version of the invention 100 as seen from above. Specifically, when comparing the right-handed version of the invention 100 to the left-handed version of the invention 100, the distal end 202 and the proximal end 203 of the invention 100 may be reversed and the blade aperture 250 and the button aperture 255 may be located on the opposite side of the pouch 220.

In use, the brace 200 may be strapped to the extremity 955 by stretching the brace 200 and sliding the brace 200 over the hand and onto the extremity 955 with the button aperture 255 and the blade aperture 250 facing away from the user. The tape measure 900 may be slid into the pouch 220 through the tape measure aperture 240. The flap 225 may be closed by moving the second end 227 of the flap 225 towards the brace 200 until the fastener 230 engages. The lock button 910 of the tape measure 900 may be moved to an unlocked position by manipulating the lock button 910 through the button aperture 255. The blade 905 of the tape measure 900 may be extended by pulling the blade 905 through the blade aperture 250. The lock button 910 of the tape measure 900 may be moved to a locked position by manipulating the lock button 910 through the button aperture 255. A measurement may be taken using the tape measure 900. The blade 905 may be left extended and locked for as long as desired. The lock button 910 of the tape measure 900 may be moved to the unlocked position by manipulating the lock button 910 through the button aperture 255. The blade 905 may be allowed to retract into the tape measure 900 through the blade aperture 250 or the blade 905 may be moved to a different length and lock again.

DEFINITIONS

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" refers to top and "lower" refers to the bottom. As a non-limiting example, the upper end of a vertical shaft is the top end of the vertical shaft.

As used herein, "align" refers to the placement of two or more components into positions and orientations which either arranges the components along a straight line or within the same plane or which will allow the next step of assembly to proceed. As a non-limiting example, the next step of assembly may be to insert one component into another component, requiring alignment of the components.

As used in this disclosure, an "aperture" is an opening in a surface. Aperture may be synonymous with hole, slit, crack, gap, slot, or opening.

As used herein, the words "couple", "couples", "coupled" or "coupling", refer to connecting, either directly or indirectly, and does not necessarily imply a mechanical connection.

As used herein, the word "desired" refers to a specific value or action within a range of supported values or action. A "desired" value or action indicates that a range of values or actions is enabled by the invention and that a user of the invention may select a specific value or action within the supported range of values or action based upon their own personal preference. As a non-limiting example, for a fan that supports operational speed settings of low, medium, or high, a user may select a desired fan speed, meaning that the user may select low, medium, or high speed based upon their needs and preferences at the time of the selection.

As used in this disclosure, the terms "distal" and "proximal" may be used to describe relative positions. Distal refers to the object, or the end of an object, that is situated away from the point of origin, point of reference, or point of attachment. Proximal refers to the object, or end of an object, that is situated towards the point of origin, point of reference, or point of attachment. Distal implies 'farther away from' and proximal implies 'closer to'. In some instances, the point of attachment may be the where an operator or user of the object makes contact with the object. In some instances, the point of origin or point of reference may be a center point or a central axis of an object and the direction of comparison may be in a radial or lateral direction.

As used in this disclosure, "elastic" refers to a material or object that deforms when a force is applied to it and that is able to return to its relaxed shape after the force is removed. A material that exhibits these qualities is also referred to as an elastomeric material.

As used in this disclosure, a "fastener" is a device that is used to join or affix two objects. Fasteners generally comprise a first element which is attached to the first object and a second element which is attached to the second object such that the first element and the second element join to affix the first object and the second object. Common fasteners include, but are not limited to, hooks, zippers, snaps, clips, ties, buttons, buckles, quick release buckles, or hook and loop fasteners.

As used in this disclosure, a "flap" is a piece of material that is hinged or otherwise attached to a surface using one side such that the piece of material hangs in such a way as to cover a hole in a surface or to provide a barrier between objects.

As used in this disclosure, "flexible" refers to an object or material which will deform when a force is applied to it, which will not return to its original shape when the deforming force is removed, and which may not retain the deformed shape caused by the deforming force.

As used in this disclosure, a "hook and loop fastener" is a fastener that comprises a hook surface and a loop surface. The hook surface comprises a plurality of minute hooks. The loop surface comprises a surface of uncut pile that acts like a plurality of loops. When the hook surface is applied to the loop surface, the plurality of minute hooks fastens to the plurality of loops securely fastening the hook surface to the loop surface.

As used in this disclosure, the word "interior" is used as a relational term that implies that an object is located or contained within the boundary of a structure or a space.

As used herein, the term "mirror image" refers to an object that has its parts reversely arranged in comparison with another similar object or that is reversed with reference to an intervening axis or plane.

As used in this disclosure, "resilient" or "semi-rigid" refer to an object or material which will deform when a force is applied to it and which will return to its original shape when the deforming force is removed.

As used herein, "rigid" refers to an object or material which is inflexible. If a force is applied to a rigid object the rigid object does not bend or deform unless the force applied reaches the breaking point of the rigid object.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A wrist or forearm brace with integral tape measure holder comprising:
    a brace, a pouch, and a flap;
    wherein the brace is adapted to wrap around an extremity of a user;
    wherein a tape measure is placed into the pouch;
    wherein a blade of the tape measure is accessible via a blade aperture and a lock button of the tape measure is accessible via a button aperture without removing the tape measure from the pouch;
    wherein the tape measure is operated without removing the tape measure from the pouch; wherein the pouch is coupled to the brace via a wrist adapter that adapts the curved shape of the extremity to a flat shape of the tape measure; and wherein the wrist adapter is a rigid or semi-rigid armature that is interposed between the brace and the pouch.

2. The wrist or forearm brace with integral tape measure holder according to claim 1
    wherein the brace is an elastic tube comprising a distal end and a proximal end.

3. The wrist or forearm brace with integral tape measure holder according to claim 2
    wherein a length of the brace as measured from the distal end to the proximal end is at least as long as the width of the tape measure.

4. The wrist or forearm brace with integral tape measure holder according to claim 3
    wherein the brace is adapted to slide over the user's hand by stretching the brace open.

5. The wrist or forearm brace with integral tape measure holder according to claim 4
    wherein the brace is adapted to contract once past the hand to grip the extremity.

6. The wrist or forearm brace with integral tape measure holder according to claim 5
    wherein the diameter of the proximal end of the brace is larger than the diameter of the distal end of the brace such that the brace is adapted to conform to the shape of the extremity.

7. The wrist or forearm brace with integral tape measure holder according to claim 5
    wherein the pouch comprises an upper wall, a distal side wall, a proximal side wall, and a bottom wall;
    wherein the pouch is a pocket into which the tape measure is placed.

8. The wrist or forearm brace with integral tape measure holder according to claim 7
    wherein the distal edge of the upper wall is coupled to the upper edge of the distal side wall;
    wherein the proximal edge of the upper wall is coupled to the upper edge of the proximal side wall;
    wherein the bottom edge of the upper wall is coupled to the upper edge of the bottom wall;
    wherein the bottom edge of the distal side wall is coupled to the distal edge of the bottom wall;
    wherein the bottom edge of the proximal side wall is coupled to the proximal edge of the bottom wall.

9. The wrist or forearm brace with integral tape measure holder according to claim 8
    wherein the side of the pouch that is opposite the bottom wall is left open to form a tape measure aperture;
    wherein the tape measure is placed into the pouch by passing it through the tape measure aperture.

10. The wrist or forearm brace with integral tape measure holder according to claim 9 wherein the height, width, and length of the interior of the pouch are at least as large as the height, width, and length of the tape measure such that the tape measure fits inside of the pouch.

11. The wrist or forearm brace with integral tape measure holder according to claim 10 wherein the distal side wall comprises the blade aperture;

wherein the blade aperture is positioned such that when the tape measure is within the pouch, the blade of the tape measure aligns with the blade aperture.

12. The wrist or forearm brace with integral tape measure holder according to claim 11 wherein the distal side wall comprises the button aperture;

wherein the button aperture is positioned such that when the tape measure is within the pouch, the lock button on the tape measure aligns with the button aperture.

13. The wrist or forearm brace with integral tape measure holder according to claim 12 wherein the flap is a flexible cover for the tape measure aperture;

wherein a first end of the flap is coupled to the pouch at an upper side of the tape measure aperture.

14. The wrist or forearm brace with integral tape measure holder according to claim 13 wherein the flap covers the tape measure aperture when the flap is pulled towards the brace;

wherein a second end of the flap couples to the brace via a fastener.

15. The wrist or forearm brace with integral tape measure holder according to claim 14 wherein the fastener is a hook and loop fastener.

16. The wrist or forearm brace with integral tape measure holder according to claim 14 wherein the wrist or forearm brace with integral tape measure holder comprises a right-handed version and a left-handed version;

wherein the left-handed version of the wrist or forearm brace with integral tape measure holder is a mirror-image of the right-handed version of the wrist or forearm brace with integral tape measure holder as seen from above.

17. The wrist or forearm brace with integral tape measure holder according to claim 16 wherein when comparing the right-handed version of the wrist or forearm brace with integral tape measure holder to the left-handed version of the wrist or forearm brace with integral tape measure holder, the distal end and the proximal end of the wrist or forearm brace with integral tape measure holder are reversed and the blade aperture and the button aperture are located on the opposite side of the pouch.

\* \* \* \* \*